US009022739B2

(12) United States Patent
Krishnan et al.

(10) Patent No.: US 9,022,739 B2
(45) Date of Patent: May 5, 2015

(54) WIND TURBINE GENERATOR WITH A LIFTING DEVICE

(75) Inventors: Venkatesh Krishnan, Karur (IN); Henning Mortensen, Randers SØ (DK)

(73) Assignee: Vestas Wind Systems A/S, Aarhus N. (DK)

( * ) Notice: Subject to any disclaimer, the term of this patent is extended or adjusted under 35 U.S.C. 154(b) by 703 days.

(21) Appl. No.: 13/323,226

(22) Filed: Dec. 12, 2011

(65) Prior Publication Data

US 2012/0201677 A1    Aug. 9, 2012

Related U.S. Application Data

(60) Provisional application No. 61/440,054, filed on Feb. 7, 2011.

(30) Foreign Application Priority Data

Feb. 7, 2011  (DK) .................................. 2011 70067

(51) Int. Cl.
*F03D 11/00*   (2006.01)
*F03D 11/04*   (2006.01)
(Continued)

(52) U.S. Cl.
CPC ............... *F03D 1/003* (2013.01); *F03D 11/04* (2013.01); *B66C 23/207* (2013.01); *F05B 2240/916* (2013.01); *Y02E 10/728* (2013.01); *Y02E 10/726* (2013.01)

(58) Field of Classification Search
CPC ............. F03D 11/005; F03D 11/0075; F05B 2240/916
USPC ............ 415/121.3, 232; 52/122.1, 125.2; 174/79, 100; 212/225; 254/4 R, 329, 254/322, 380; 416/142, 246, DIG. 6; 294/67.1, 67.33, 67.4, 67.41, 82.1, 85
See application file for complete search history.

(56) References Cited

U.S. PATENT DOCUMENTS

| 8,172,100 | B2 * | 5/2012 | Kappel et al. ................. 212/323 |
| 2007/0200103 | A1 * | 8/2007 | Viladomiu i Guarro et al. ............................ 254/334 |

(Continued)

FOREIGN PATENT DOCUMENTS

| EP | 2 182 202 | 5/2010 |
| EP | 2 261 500 | 12/2010 |

(Continued)

OTHER PUBLICATIONS

European Search Report for EP 11 19 3718, Jun. 5, 2014.

(Continued)

*Primary Examiner* — Edward Look
*Assistant Examiner* — Jason Davis
(74) *Attorney, Agent, or Firm* — Patterson & Sheridan, LLP

(57) ABSTRACT

A more efficient and simple wind turbine generator with a lifting device and method of using the lifting device is disclosed. A wind turbine generator comprises a tower, a nacelle supported by the tower, the nacelle comprising a foundation supporting components of the nacelle, a yawing system comprising a yaw bearing enabling rotation of the nacelle relative to the tower, a lifting device internally in the wind turbine generator and capable of moving an item, a support supporting the lifting device, and wherein the lifting device is moveable in a horizontal direction from a first position to a second position, and at least one of the positions is, in a vertical direction, between a lowermost level of the foundation, such as just above the yaw bearing, and an uppermost level of the tower, such as just below the yaw bearing.

23 Claims, 9 Drawing Sheets

(51) Int. Cl.
 *F03D 1/00* (2006.01)
 *B66C 23/20* (2006.01)

(56) References Cited

U.S. PATENT DOCUMENTS

2009/0267038 A1* 10/2009 Teichert et al. ............... 254/335
2010/0111665 A1* 5/2010 Daniels ......................... 414/814
2011/0211955 A1* 9/2011 Eriksen et al. ..................... 416/9
2012/0006578 A1* 1/2012 Schubert ......................... 174/79
2012/0014775 A1* 1/2012 Numajiri et al. .............. 414/800

FOREIGN PATENT DOCUMENTS

WO 2007/096008 A1 8/2007
WO 2010/031528 A2 3/2010

OTHER PUBLICATIONS

Sven Nytoft Rasmussen; 1st Technical Examination and Search Report issued in priority Denmark Application No. PA 2011 70067; Oct. 24, 2011; 9 pages; Denmark Patent and Trademark Office.

* cited by examiner

WIND TURBINE GENERATOR WITH A LIFTING DEVICE

CROSS-REFERENCE TO RELATED APPLICATIONS

This application claims priority under 35 U.S.C. §119(a) to DK Application No. PA 2011 70067, filed Feb. 7, 2011. This application also claims the benefit of U.S. Provisional Application No. 61/440,054, filed Feb. 7, 2011. Each of these applications is incorporated by reference herein in its entirety.

TECHNICAL FIELD

Aspects of the invention relate to a wind turbine generator with a lifting device. Aspects of the invention relate to a lifting device which is particularly efficient for servicing, such as replacing, items of the wind turbine generator.

BACKGROUND

A Wind Turbine Generator (WTG) is used to convert kinetic energy comprised in the wind into another form of energy, such as mechanical energy and most often also from mechanical energy into electrical energy. A WTG as embodied herein is of a type with a rotational axis substantially in a direction of the wind. When assembled on site such WTG comprises a vertically extending tower with a base in a bottom of the tower and a nacelle which is supported by the tower on top of the tower. The nacelle can be rotated relative to the tower, such as in response to a direction of the wind and such as via a yawing system positioned in a transition between the tower and the nacelle.

During service of the WTG various items of the WTG may need replacement, such as due to wear and tear after several years of duty in the WTG. Furthermore, when servicing the WTG, service personnel may alternatively or additionally need various other items such as tools or other equipment. Such items may have a weight of several hundred kilos and thus may require help from a moving and/or a lifting device for moving and/or lowering and/or raising the items and/or tools and/or equipment from or to a position in an uppermost part of the WTG, such as to or from, respectively, the base of the tower.

Published European application EP2182202 discloses a method for removing and replacing an article of wind turbine equipment, such as a yaw drive, internal to a nacelle of a wind turbine tower without use of an external wind farm site crane or external rigging on the wind tower. The application discloses that external rigging of wind turbine tower components may expose workers and the equipment inside the nacelle to outside weather and hazardous wind conditions. The yaw drive is internally rigged with an internal support crane within the nacelle and translated to an internal winch capable of supporting the yaw drive during a lift to the base of the wind turbine tower.

The method includes a number of method steps and may, for example, be found to require a relatively high effort to perform a task which may be relatively simple, such as replacing a yaw drive in the yawing system. In consequence, embodiments of the present invention have been devised.

SUMMARY

Embodiments of the present invention provide an improved wind turbine generator comprising a lifting device, an improved method of moving an item in a wind turbine generator and an improved support for supporting a lifting device in a wind turbine generator.

Alternatively or additionally, embodiments of the present invention provide a wind turbine generator with a lifting device and a method of using the lifting device which improves personnel safety and working conditions upon usage of the lifting device, such as when replacing items comprised in a yawing system of the wind turbine generator.

Alternatively or additionally, embodiments of the present invention provide a wind turbine generator with a lifting device and a method of using the lifting device which prevents personnel and equipment inside the nacelle from being exposed to outside weather and hazardous wind conditions, such as when replacing items comprised in a yawing system of the wind turbine generator.

Alternatively or additionally, embodiments of the present invention provide a wind turbine generator with a lifting device and a method of using the lifting device which WTG and method are simple and yet effective.

In particular, it may, alternatively or additionally to the above, be seen as an aim of embodiments of the present invention to provide a wind turbine generator with a lifting device and a method of using the lifting device for moving and/or lowering and/or raising an item, such as to and/or from a base of the wind turbine generator which requires a minimum of investment and a minimum of effort when used.

Preferably, the invention alleviates, mitigates or eliminates one or more of the above or other disadvantages singly or in any combination.

These and other objects are fulfilled by a wind turbine generator comprising
a tower,
a nacelle supported by the tower, the nacelle comprising a foundation supporting components of the nacelle,
a yawing system comprising a yaw bearing enabling rotation of the nacelle relative to the tower,
a lifting device internally in the wind turbine generator and capable of moving an item,
a support supporting the lifting device, and wherein the lifting device is moveable from a first position to a second position, and at least one of the positions is, in a vertical direction, between a lowermost level of the foundation, such as just above the yaw bearing, and an uppermost level of the tower, such as just below the yaw bearing.

Thus, an improved wind turbine generator comprising a lifting device is obtained. The improvement may be seen to lie therein that when arranging the lifting device in accordance with the described, a simple and yet effective wind turbine generator with a lifting device is provided. The support supporting the lifting device is preferably comprised internally in the WTG.

Traditionally, and as an example, it may be seen that lifting devices of a WTG have been arranged so as to lower items, such as in connection with service of the WTG, for example, to and from a nacelle through an opening in the nacelle which opening leads to the outside of the WTG. Such lifting devices have usually been arranged at a level in a roof, i.e., a top most part, of the nacelle 104 or at other position of the nacelle but, for example, at a position in the Y-direction which is not in the proximity of the tower and/or the yaw bearing, so as to be clear from the tower when lowering items using such equipment. Other solutions use various lifting and/or moving equipment installed at various levels and positions inside the WTG in order hereby to move items, such as to lower the items inside the WTG.

Such various lifting and/or moving equipment has been found to be less effective than the lifting equipment, including the support, as described herein. Examples of further effectiveness and ease of using aspects of the present invention are described herein. It will be understood that with embodiments of the present invention, there is provided a support, lifting device, WTG and method of moving items, such as lowering or raising items, with the lifting device which does, for example, not require the effort and/or installation cost and/or cost of using the various moving and/or lifting equipment of traditional systems.

When the lifting device is furthermore capable of lowering and raising the item from one of the positions and to another position, such as a base of the tower, even further service tasks can be performed using the lifting device. It is seen as an advantage that the same lifting device as described, enables an operator of the lifting device to access an item and connect to the item with the lifting device, for example, at the first position, and, for example, move the item to a position, such as to lower the item to a base of the WTG.

In accordance with an embodiment of the invention, at least one of the first or second positions, such as the first position, is/are comprised in a limited space formed by a boundary of a perimeter, see an example of such boundary in FIG. 8 with the reference number 404, such as a perimeter surrounding at least part of the yaw bearing, in the horizontal direction and the lowermost level of the foundation and the uppermost level of the tower, in the vertical direction. In this limited space there is usually provided a number of items which may require service, such as replacement. A perimeter, i.e., a given boundary, may have any form, such as circular, rectangular, with 6 connecting edges, etc.

In accordance with an embodiment of the invention, at least one of the first or second positions, such as only the second position, is/are comprised in an extended space formed by the boundary, the lowermost level of the foundation and a level of a top landing in the wind turbine tower. In accordance herewith an effective solution which will at least enable an item to be moved from the limited space into the extended space with one and the same lifting device is provided.

In accordance with an embodiment of the invention, both the first and the second positions are comprised in the limited space and the lifting device is moveable in or on the support from the first position to the second position, or vice versa, along a path comprised in the limited space. This may be seen to be particularly effective, for example, when compared to accessing an item in the limited space with a first lifting mechanism or means and moving the lifting mechanism or means and/or the item out of the limited space with the first lifting mechanism or means and from that place or position to another position with another lifting mechanism or means.

In accordance with an embodiment of the invention, the support comprises an annular rail. In accordance with this embodiment, a support for the lifting device which is found particularly simple and efficient, for example, for reaching an item in the yawing system with the lifting device, such as a yaw drive, moving the item connected to a connector of the lifting device to another position, such as a second position, and/or lowering the item with the lifting device, is provided. Preferably, the rail is endless, for example, in order to increase strength and/or stability of the support and/or to enable a continued rotation of the lifting device along the endless annular rail, such as, for example, up to 5-7 complete circles in one direction.

Additionally or alternatively, when the support to the annular rail comprises a beam, possibly arranged so as to reach the first and second positions with the lifting device supported by this beam, an alternative or addition to the annular rail is provided. When used as an alternative it may, at least in some embodiments, such as when the beam is supported in the tower, be found that some positions along the yaw bearing can not be reached, for example, due to a solid and unbendable beam which have substantially the same length as a diameter of the tower.

When the support is as described in connection with the FIGS. 11 and 12 embodiment(s) of the support, a beam, such as the beam 1104 illustrated there, is a suitable support comprised in the tower.

When a beam is used in addition to the annular rail, for example, as disclosed in FIG. 9, the beam can be used to enable a lifting device supported by the beam and which beam is supported by the annular rail, to reach positions both on a given perimeter and, for example, towards a middle or a centre of such perimeter, for example, in dependence of the length of the beam.

It may be desirable that the lifting device supported by the support is adapted to move relative to the support, such as by comprising a guide and/or one or more wheels in moveable engagement with the support, in that it may be found that such solution may, for example, enable increased production and installation tolerances for the support, which may be found as a benefit, in order to provide movement of the lifting device relative to a fixed structure, such as the tower. Such movement of the lifting device relative to the support can, for example, be provided by sliding the lifting device along the support in a guide or alternatively or additionally by one or more wheels enabling the lifting device to travel in the support.

In accordance with an embodiment, the support is fixed to an uppermost part of the tower. When such support position at such level is provided a way, manner and position of supporting the lifting device, which may be found simple and yet may be seen to enable direct access to an item and movement of the item as described herein with the lifting device.

In accordance with another embodiment, the support is fixed to the nacelle, such as to a lowermost part of a foundation for a drive train, which drive train and foundation are in the nacelle and rotate with the nacelle. With such support position and level a way, manner and position of the support of the lifting device, which may be found to be particularly effective, when, for example, having to replace a yaw drive, is provided. The further effectiveness may be provided in that a somewhat higher support position is hereby enabled than when, for example, supporting the lifting device to the tower, while still having a lifting device which may, for example, be transferred in an open space adjacent to the yaw bearing, such as between the first and second position described herein.

If for some reason the lifting device is not able to maintain a position in which it is supported by the support at this level, for example, when the nacelle rotates, and even though it may only move along the support in the same pace and direction as that of the nacelle and thus not be seen as an obstacle for the rotation of the nacelle relative to the tower, the lifting device may be displaced somewhat in its fixture or completely removed from its fixture for later installation and/or use.

In accordance with yet another, possibly particular, embodiment the support is fixed to the yaw bearing, such as to a yaw pinion ring or a casing thereof. Hereby, for example, a decrease of any bending moments when, for example, lifting items with a centre of mass in the proximity of the perimeter of the yaw bearing and at a level in the proximity of the yaw bearing, possibly with a certain type of support and/or a certain type of lifting device, can be provided. Thus, such position provides an increased advantage of possibly being able to select a certain lifting device and support which lifting device and support does, for example, not necessarily need to be particularly strong and/or heavy and thus likely of less cost. Still further, there may be seen to be particularly much open space for such a support and/or lifting device at such level and position(s).

As an alternative to fixing the support to various parts at various levels, a support such as an endless annular rail may be provided so as for the support to be able to move relatively to the tower and/or relatively to the nacelle.

When the support comprises a channel formed member, such as shown in FIGS. 11 and 12, with an inner space inside and suitable for encompassing various cables, etc. from or to the nacelle and supporting a lifting device on the outside, a particular embodiment of a support for the lifting device in order to reach one or more of the first and second positions, is provided.

The disclosed lifting device, support and method of using it, etc. may be found particularly effective for a WTG where, for example, a main part of one or more yaw drives and/or a centre of mass of such yaw drives, for rotating the nacelle relative to the tower by exerting a driving force to a part of the yawing system, are positioned in the tower and/or at least beneath the foundation comprised in the nacelle, in a vertical Z-direction.

It may be seen as an advantage, when the lifting device is moveable from the first position to the second position along a path of a perimeter in a range of perimeters. That is when the movement of the lifting device is provided along the path and not only, for example, the first position and the second positions are provided on a given perimeter. Such movement, support and lifting device may be seen to enable an efficient way of moving the lifting device, for example, to a given position at a given item.

Independent of the various embodiments it may be seen as an advantage of embodiments of the present lifting device, support and method of using these devices, that items at different positions as described can be reached and moved with the lifting device and, for example, lowered to a base, without changing lifting device, and/or, for example, also without rotating the nacelle relative to the tower. Such rotation of the nacelle may, for example, not even be possible, for example, due to a service task not yet performed in the yawing system.

In accordance with a method aspect of the invention, there is provided a method of moving an item internally in a wind turbine generator, the wind turbine generator comprising a tower, a nacelle supported by the tower, a yawing system comprising a yaw bearing enabling turning the nacelle relative to the tower, a lifting device internally in the wind turbine generator and capable of moving the item and a support supporting the lifting device, the method comprising with the lifting device in a first position, connecting a lifting medium, such as a wire or chain, of the lifting device to the item, moving the lifting device from the first position to a second position, where the positions are different in a horizontal direction, and at least one of the positions is, in a vertical direction, between a lowermost level of the foundation, such as just above the yaw bearing, and an uppermost level of the tower, such as just below the yaw bearing.

Thus, an improved method of moving an item as described herein is provided. An advantage of the method may be seen to lie therein that hereby, for example, an item such as a yaw drive can be supported by the lifting device, moved while supported as described and moved to a second position as disclosed herein and such as to a base of the tower.

When one of the positions, such as the second position, allows lowering the item through a hatch hole comprised in a top landing of the tower and further on towards the base of the tower, a possible advantage is that such position may be reached by the lifting device in the support.

According to an aspect of the invention, there is provided a support for supporting a lifting device in a wind turbine generator, where the wind turbine generator comprises a tower, a nacelle including a drive train and a foundation for the drive train, and a yawing system for rotating the nacelle relative to the tower, the support having support member or means for supporting the lifting device in at least a first and a second position, and installing device or means for installing the support in the wind turbine generator at a vertical position between a lowermost level of the foundation, such as just above the yaw bearing, and a level of a top landing in the wind turbine tower.

The vertical position is preferably adjacent to the yaw bearing, which yaw bearing is arranged in a transition between the tower and the nacelle.

The support member or means for supporting the lifting device in the at least first and second positions may as an example comprise a plane surface of the support relative to which surface the lifting device is moveable in order to reach the positions while supported by the support.

The installing device or means for installing the support in the wind turbine generator at a vertical position between a lowermost level of the foundation, such as just above the yaw bearing, and a level of a top landing in the wind turbine tower, may comprise steel latches or hooks or wheels or similar devices in order to connect the support to a fixed or moving structure.

According to embodiments of the invention, the support member for supporting a lifting device in a wind turbine generator may as an example be retrofitted in such wind turbine generators whereby problems of traditional moving and/or lifting system or other disadvantages mentioned or understood by a skilled person are solved, alleviated or mitigated. Alternatively, such support is installed initially or at a first service task in the WTG, e.g., a service task related to the yawing system.

The support may comprise an endless annular rail, for installation in the wind turbine generator at a vertical position between a lowermost level of the foundation, such as just above the yaw bearing, and an uppermost level of the tower, such as just below the yaw bearing. Alternatively or additionally, the support may comprise a channel formed member, such as a channel formed member supported by or fixed to a level a top landing in the wind turbine tower.

Any advantage mentioned herein may be seen as a possible advantage provided by the invention, but it may also be understood that the invention is particularly, but not exclusively, advantageous for obtaining the described advantage.

In general, the various aspects and advantages of embodiments of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION

Figure 1:
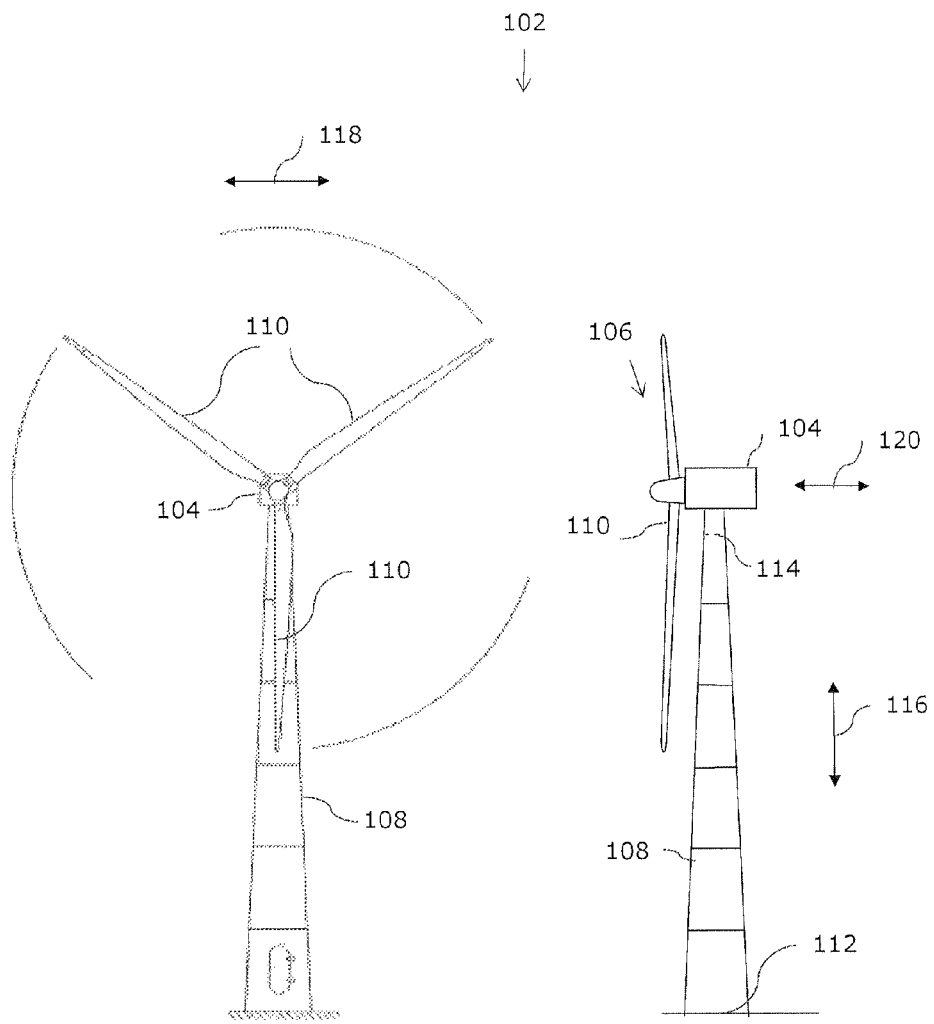
FIG. 1 illustrates a wind turbine generator.

FIG. 1 illustrates a wind turbine 102 in a front and side view. The wind turbine generator comprises a nacelle 104, and a rotor 106 rotatably mounted to the nacelle 104. The nacelle 104 is mounted on a tower 108 via a rotary joint named a yaw bearing, which yaw bearing is usually positioned in a transition between the nacelle and the tower.

The tower 108 may have a height of, for example, hundred metres or more measured from a base 112 of the tower. The tower may include a number of platforms or landings internally in the tower, where an uppermost of these landings may be referred to as a top landing 114, as illustrated with a dashed line and referred to with the reference number 114. The nacelle generally includes a foundation, for example, for various parts of the WTG, such as bearings for the rotor and a drive train of the WTG. As illustrated the rotor 106 extends out of the nacelle and may, for example, comprise three WTG blades 110 for catching the wind and thus enabling conversion of the kinetic energy of the wind into mechanical energy.

Directions X 118, Y 120 and Z 116 are illustrated in FIG. 1. X and Y are both substantially horizontal directions as illustrated and perpendicular to each other. The Y-direction can be defined to be along the direction of the wind when the nacelle is rotated so as to be pointed directly towards the wind for maximum collection of energy. Z is a vertical direction perpendicular to the X and Y directions.

Figure 2:
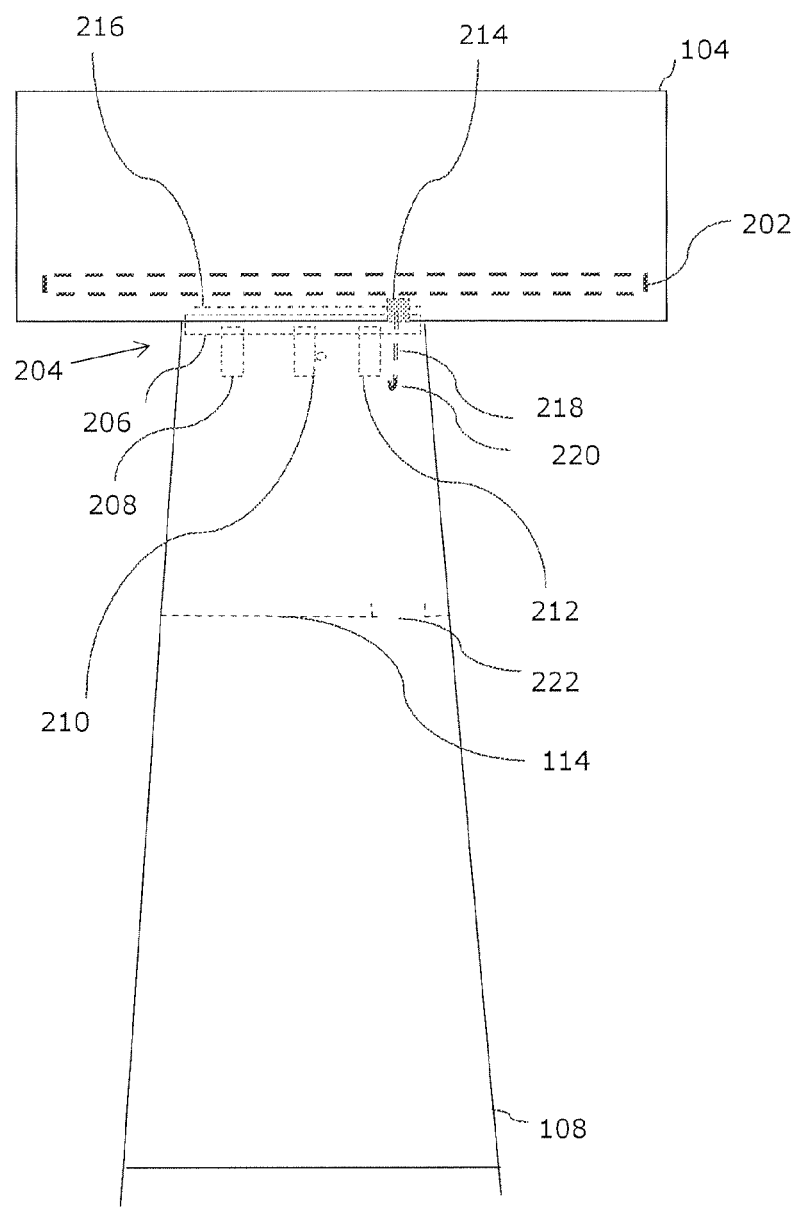
FIG. 2 is a side view where the nacelle and an uppermost portion of the tower is illustrated in an enlarged view relative to FIG. 1.

FIG. 2 is an illustration of a side view where the nacelle 104 and an uppermost portion of the tower 108 are enlarged relative to FIG. 1. Some parts internally of the nacelle 104 and the tower 108 are illustrated with dashed lines, whereas other parts normally comprised in the nacelle, such as a shaft, drive train and generator are not illustrated in the figure. The top landing 114 with a hatch hole 222 is illustrated at a level which may be found to be, for example, 2-3 meters below a mid level of the yaw bearing in the Z-direction.

The figure illustrates that the WTG illustrated in FIG. 1 includes a nacelle 104 with an internal foundation 202, which foundation is supported by the tower 108 via a yawing system 204 including a yaw bearing 206 enabling rotation of the foundation and the nacelle relative to the tower. The foundation can be a rigid and often a more or less closed barrier between the nacelle and the tower. The foundation may, for example, comprise a number of girders and/or plates, for example, for transferring bending moments, etc. from the rotor to one or more rotor bearings (not shown) and to the foundation and further on via the yaw bearing into the tower and to the base of the tower.

Figure 3:
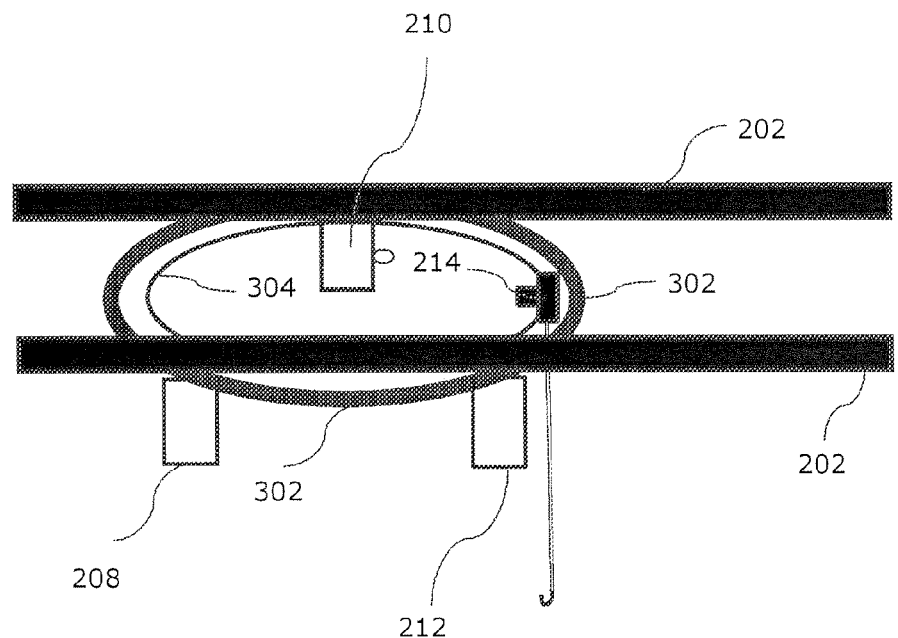
FIG. 3 is a perspective side view of the foundation, support and lifting device, etc. from FIG. 2 when seen from slightly above the foundation.

The illustrated yawing system 204 comprises three yaw drives 208, 210 and 212 for rotating the nacelle relative to the tower by exerting a driving force to a part of the yawing system, such as a yaw pinion ring, which yaw pinion ring is not illustrated in FIG. 2, but in FIG. 3 with the reference number 302. The yaw drives 208, 210, 212 are positioned at three different positions along or adjacent to a perimeter of the yaw bearing 206.

FIG. 2 also illustrates a lifting device 214, such as a winch or a hoist, internally in the wind turbine generator which lifting device is capable of lowering and raising an item, such as a yaw drive or a tool or other equipment, and a support 216 supporting the lifting device 214.

The item may be connected to a rope, wire or chain 218 or similar lifting medium which usually has a fixed or substantially fixed length but where, for example, an end thereof can be lowered and/or raised by the lifting device and which lifting medium is usually flexible in at least one dimension in order, for example, to be rolled around a circular member such as a drum of the lifting device. The connection can be facilitated by a connector 220, such as a hook, or similar means which can be lowered and/or raised by the lifting device.

In the present embodiment, the lifting device comprises an electrical motor which is able to lower and/or raise the chain 218. The chain has the connector 220, such as the hook, attached in an end of the chain 218.

In FIG. 2, the lifting device 214 is illustrated in a position, such as a first position. In FIG. 2, the lifting device is supported by a support which is extending in a vertical plane in at least one of the vertical X and Y directions and positioned just above the yawing bearing. The support may as examples be supported from, see FIG. 4, or fixed to or incorporated in or rotated relatively to, a lowermost part of the foundation 202.

The illustrated yawing system 204 comprises the yaw bearing 206 and the yaw drives 208, 210 and 212 for rotating the nacelle 104 relative to the tower 108 by exerting a driving force to a part of the yawing system, such as an inner toothed yaw pinion ring 302 (see FIG. 3). The illustrated yawing system may be of a type similar to the yawing system published in international application WO2008053017. In WO2008053017 a toothed ring, with reference number 3 in that document, is internally toothed.

This may be seen to make it easier, but not a necessity for, positioning the yaw drives, or at least a centre of mass of such yaw drives, inside a tower of the wind turbine, such as also shown in the embodiments illustrated in the present document and figures hereof. But, even with an externally toothed ring of the yawing system, yaw drives, etc. may be positioned within the tower, such as by providing one or more pinion gears, i.e., a relatively small pinion which are operably connected to a shaft of a yaw drive and operably connected with the teeth of the ring 3, at an outer circumference of the ring, but where the shaft of the yaw drive is not necessarily positioned inside an inside circumference of the yaw bearing.

FIG. 3 is a perspective side view of the foundation 202, the support 216 and the three yaw drives 208, 210 and 212 and the lifting device 214 when seen from slightly above the foundation 202. The support 304 is illustrated as fixed to the lowermost part of the foundation 202. Such lowermost part of the foundation is usually provided in the proximity of the yaw bearing.

In FIG. 3, only a yaw pinion ring 302 of the yaw bearing is illustrated. It can be seen that the support comprises an endless annular rail 304 with a centre in the middle of the yaw pinion ring 302 and which annular rail is shown as circular and has a diameter which is slightly less than a diameter of the yaw pinion 302. It will be understood that, for example, the diameter of the annular rail may be elected somewhat smaller or larger than this, and that other types of supports are possible, for example, in order to be able to access items comprised in the yawing system with the lifting device 214, and, for example, move the lifting device and the item to another position, such as a second position.

Figure 4:
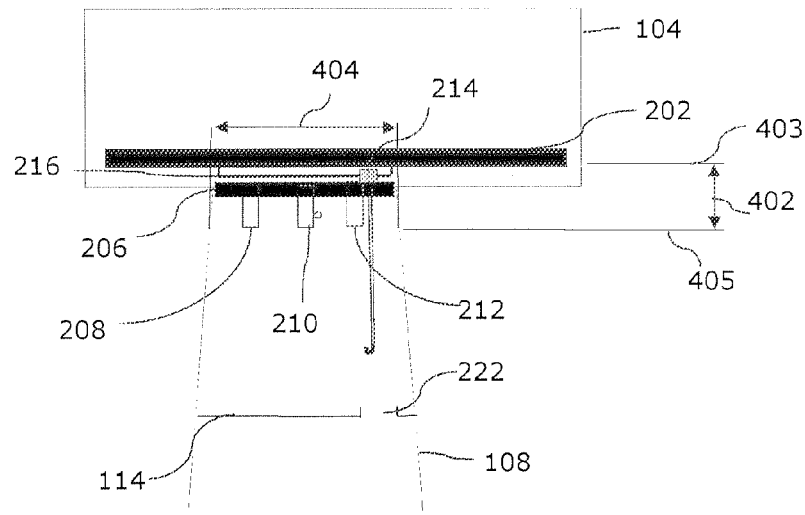
FIG. 4 is a side view of the yaw bearing, support and lifting device, etc., where the support is fixed to a lowermost part of the foundation, e.g., at the lowermost part of the foundation or just below the lowermost part of the foundation, or supported at this level and able to move relative to the foundation.

FIG. 4 is a side view of the yaw bearing 206, support 216, lifting device 214, yaw drives 208, 210 and 212 as well as the foundation as illustrated in FIG. 3. In a simplified manner it is illustrated that the support is fixed to the lowermost part of the foundation 202, for example, at the lowermost level of the foundation or just below the lowermost part of the foundation, or supported at this level and able to move relative to the foundation at this level. The outer circumferences of the nacelle 104 and part of the tower 108 are illustrated with thin lines. The outer surfaces of the nacelle and the tower are illustrated as invisible.

In FIG. 4 as well as in the following FIGS. 5, 6 and 7 it is illustrated that a vertical direction range 402, thus a direction which is usually defined as the Z-direction in the field of wind turbine generators, comprises a level of the yaw bearing 206 and has an upper vertical direction range limit 403 and a lower vertical direction limit 405.

The upper vertical direction range limit 403 is as illustrated set to be at a level when, for example, the support is fixed to or supported at or in the lowermost part of the foundation 202, possibly see or refer to FIG. 4. The lower vertical direction limit 405 is as illustrated set to be at a level when, for example, the support is fixed to or supported at an uppermost level of the tower 108, for example, just below the yaw bearing 206, possibly also refer to FIG. 7, for example.

A support level of the lifting device 214 in the vertical direction may be accomplished by the level at which the support is fixed, or, alternatively or additionally, for example, by lifting or lowering the lifting device 214 somewhat in the Z-direction (vertical). This may be accomplished by a slightly adjustable support fixture of the lifting device, such as a lifting device support comprising a member which is extendable or moveable relative to a fixed structure in order to obtain a slightly changed position of the lifting device 214.

Similarly, it is illustrated that the lifting device 214 is positioned in a limited space. The limited space can be described as provided inside a boundary of a perimeter, such as the boundary illustrated with 404 in FIG. 4 and seen from FIG. 8 to surround the yaw bearing in the horizontal plane.

It may be preferred and it may be seen as an advantage of the lifting device, its support and the method of using it, etc. disclosed herein, that the lifting device can be arranged and, for example, supported in a manner as disclosed herein, so that, for example, the lifting device can be moved between the first and second positions as described herein. Thus, these positions may be reached with one and the same lifting device 214, supported as disclosed herein. Furthermore an item can be lowered or raised by said lifting device 214.

An insight may, for example, be seen to lie therein and an advantage of the lifting device 214, its support and the method of using it as disclosed herein, may, for example, be seen to be that when using an open space, for example, for the support and/or the lifting device, adjacent to the yaw bearing, so as just above the yaw bearing or just below the yaw bearing and/or inside a circumference of the yaw bearing or just outside a circumference of the yaw bearing, thus an open space within the limited space as defined an efficient apparatus and manner of supporting a lifting device and/or moving and possibly lowering items is provided.

That the support in FIG. 4 is able to move relative to the lowermost part of the foundation is to be understood so that the support may, for example, be supported by a number of fixed wheels (not shown) and so that the support 216 is moveable, or rather rotatable in this example, relative to each wheel axis and thus the foundation. Similarly, in FIGS. 5 and 6, the support may be able to move relative to the nacelle and/or the tower and in FIG. 7 the support may be able to move somewhat relative to the tower. Additionally or alternatively, and possibly it may be preferred that the lifting device 214 is moveable in or on the support 216.

Figure 5:
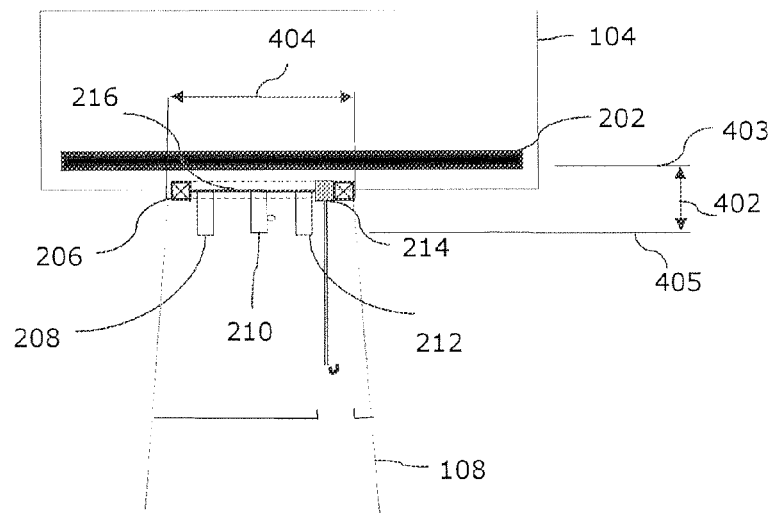
FIG. 5 is a side view of the yaw bearing, support and lifting device, etc., where the support is fixed to the yaw bearing, e.g., equal or substantially equal to a middle level of the yaw bearing, or supported at this level and able to move relative to the nacelle and/or the tower.

FIG. 5 is a side view of the yaw bearing 206, illustrated with dashed lines, support 216, lifting device 214, etc., where the support 216 is fixed to the yaw bearing such as equal to or substantial equal to a mid level of the yaw bearing in the Z-direction, or supported at this level and able to move relative to the nacelle and/or the tower 108.

Figure 6:
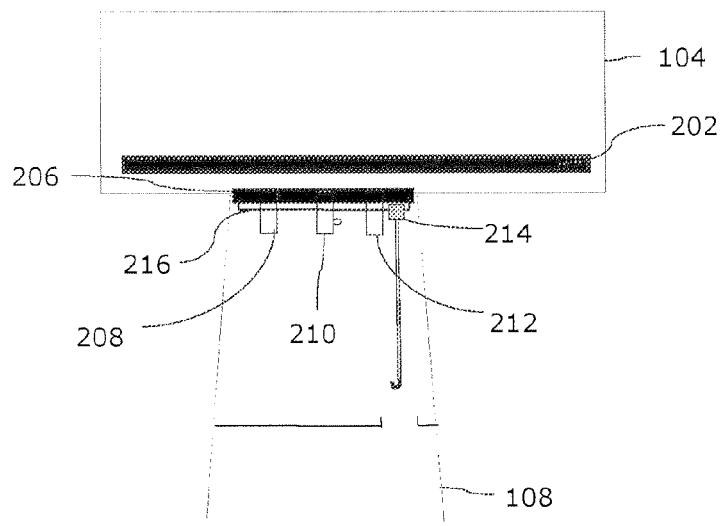
FIG. 6 is a side view of the yaw bearing, support and lifting device, etc., where the support is fixed to a lowermost part of the yaw bearing, e.g., just below the yaw bearing, or supported at this level and able to move relative to the nacelle and/or the tower.

FIG. 6 is a side view of the yaw bearing 206, support 216 and lifting device 214, etc., where the support 216 is fixed to a lowermost part of the yaw bearing 206, for example, just below the yaw bearing, or supported at this level and able to move relative to the nacelle and/or the tower.

Figure 7:
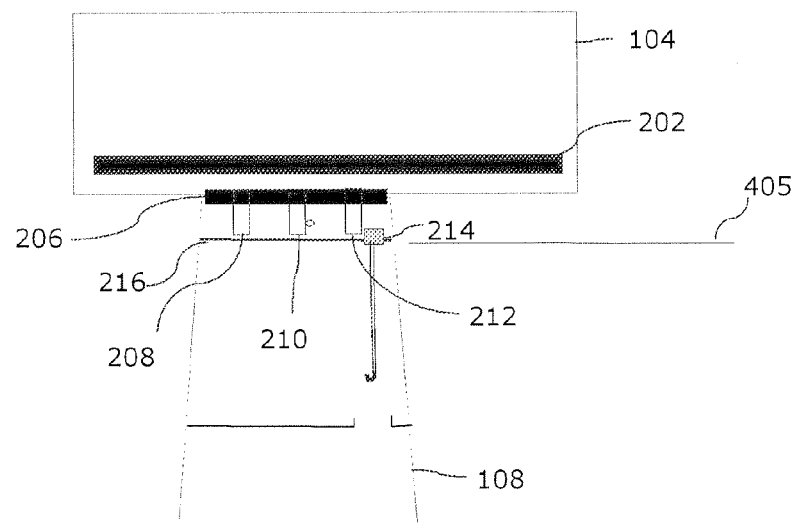
FIG. 7 is a side view of the yaw bearing, support and lifting device, etc., where the support is fixed to an uppermost part of the tower, e.g., just below the yaw bearing, or supported at this level and able to move relative to the tower.

FIG. 7 is a side view of the yaw bearing 206, support 216 and lifting device 214, etc., where the support 216 is fixed to an uppermost part of the tower 108, for example, just below the yaw bearing 206, or supported at this level and able to move relative to the tower.

Figure 8:
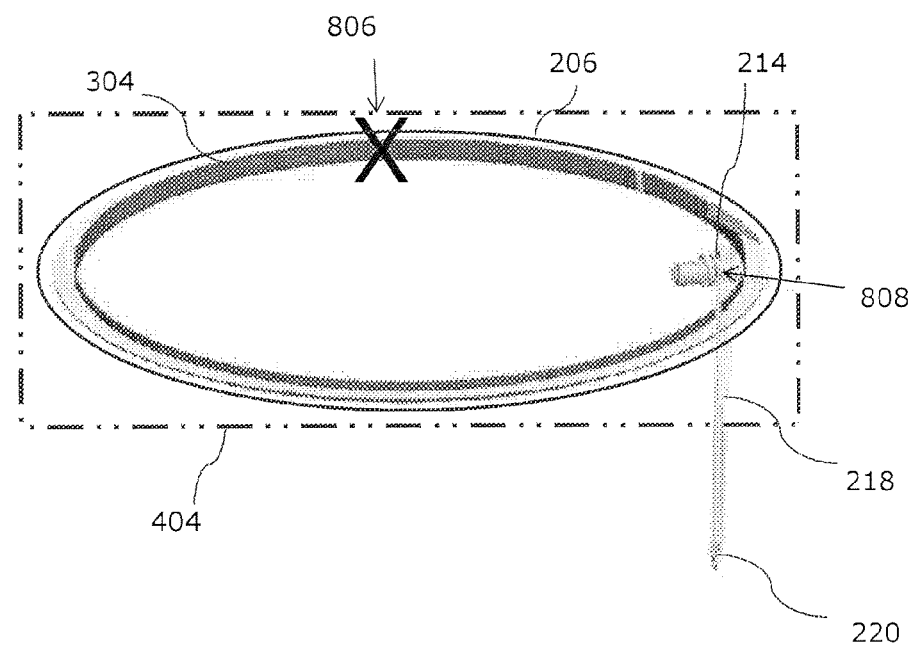
FIG. 8 is a perspective side view of the support and lifting device when seen from slightly above the support, which illustrates that the lifting device is moveable, e.g., between a first position and a second position as shown.

FIG. 8 is a perspective side view of the support illustrated as an endless annular rail 304 and lifting device 214 when seen from slightly above the support. The figure illustrates that the lifting device 214 is moveable, in or on the support, for example, between a first position 806 illustrated with a cross at 806, which may be referred to as more or less at 0 degrees on a perimeter and a second position 90-120 degrees from the first position at a second position 808.

The illustration shows that both positions of the lifting device 214 are comprised inside the boundary 404, in the example a square formed boundary 404 which is formed to surround the yaw bearing in the horizontal plane. The yaw bearing 206 is for simplicity of the illustration, illustrated with a circular line in this figure as well as in FIGS. 9 and 10.

Figure 9:
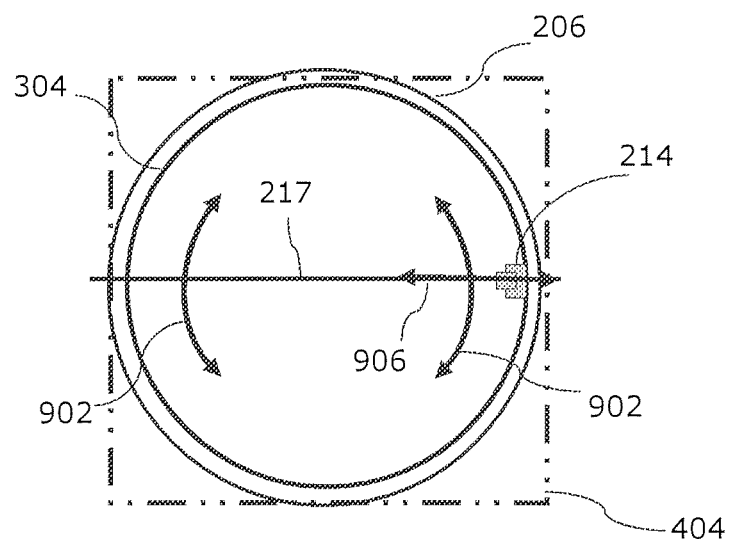
FIG. 9 is a top view of the support and lifting device illustrating that the support includes an annular support and a beam.

FIG. 9 is a top view of the support and lifting device illustrating that the support includes an annular rail 304 and a beam 217.

The beam 217 is moveably supported in or on the annular rail, such as rotatable relative to the annular rail 304 as illustrated with the two way circular section arrows 902. Alternatively or additionally, the annular rail is moveable, such as rotatable, relative to another structure and the lifting device 214 is moveable in or on the annular rail as illustrated with the two way arrow 906. In this embodiment of the support for the lifting device 214 as well as for the embodiment in FIG. 10, the lifting device 214 may be moved between positions, which positions are provided on or along or in the proximity to the circumference of the yaw bearing.

But due to the beam 217, the lifting device is, for example, also able to provide access to positions on or along a chord inside the circumference of the bearing and/or the annular rail. The beam 217 may be supported on opposite positions of the rail 304, as shown, but may alternatively only extend towards a middle of the rail and only by supported on one side of the circumference of the annular rail 304.

In other words, in FIG. 9 the support 304 and/or 217 may be able to move relatively to the nacelle and/or to the tower at a given support level. Additionally or alternatively, the lifting device 214 may be moveable in or on the support 304 and 217.

Figure 10:
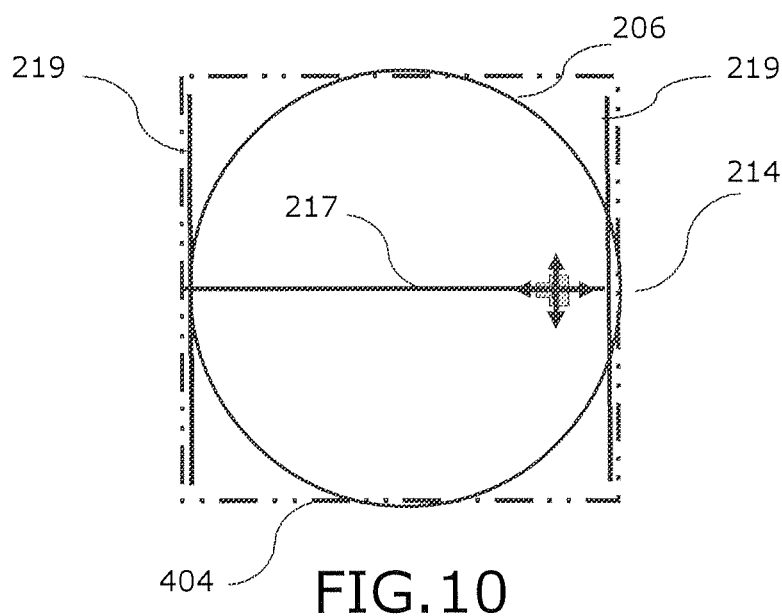
FIG. 10 is a top view of the support and lifting device illustrating that the support includes a first beam which is able to travel along two others beams, in which the first beam the lifting device is moveable.

FIG. 10 is a top view of the support and lifting device 214 illustrating that the support includes a first beam 217 which is able to travel along two other beams 219, in which first beam 217 the lifting device 214 is moveable.

Thus, in FIG. 10 the beam 217 is able to move relative to the nacelle and/or relative to the tower at this support level by moving in a direction of the two other beams. Additionally or alternatively, the lifting device may be moveable in or on the beam 217.

Figure 11:
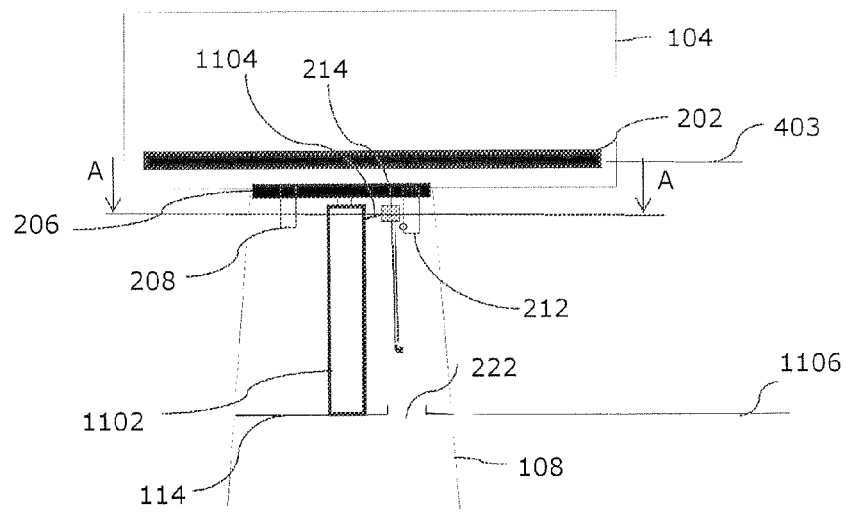
FIG. 11 is a side view of a further embodiment of the support, lifting device, etc.

FIG. 11 is a side view of a further embodiment of the support, lifting device, etc. The figure illustrates the support for the lifting device 214. The figure illustrates an elongated channel formed member 1102 which extends towards the yaw bearing from the top landing 114 and to a level in the vertical direction within the vertical direction range 402. The elongated channel formed member is centred or substantially centred in the middle of the tower 108.

A beam 1104 extends in a radial direction from the channel formed member 1102. The lifting device 214 is supported by the channel formed member 1102 and in the illustrated example by the beam 1104. The channel formed member has an inner diameter or a space inside it, suitable for encompassing various cables, etc. (not shown) from and to the nacelle, such as power cables from an electrical generator comprised in the nacelle 104. The channel formed member itself may be moveable relative to the tower 108. The channel formed member may be supported by, such as rotatably supported via a bearing, and/or fixed to either the tower 108 or the top landing or alternatively and, for example, to the lowermost part of the foundation or another member in the nacelle. Alternatively or additionally, the lifting device may be moveable, such as along and/or up and down a circumference or outer surface of the channel formed member.

The channel formed member 1102 is also illustrated as supported by the top landing 114 and thus in this way arranged so as to enable support of the lifting device 214 at a level along a vertical extension of the member 1102 and in a position along a circumference of the member 1102 from the level, illustrated at 1106, of the top landing 114 and to a level until an upper limit 403 of the vertical direction range 402.

Thus, the illustrated embodiment shows that at least one position of the lifting device, such as only the second position, can be comprised in an extended space formed by the perimeter boundary 404, the upper vertical direction range limit 403 and a lower boundary of an extended space, where the lower boundary includes a level of the top landing in the wind turbine tower.

A still further alternative embodiment of the support is to provide an annular rail with a diameter similar to the channel formed member illustrated in FIG. 11. Such annular rail could have a construction similar to that shown in FIG. 8, but where, for example, the lifting device and the support are adapted, for example, with guides and or wheels or similar means, so that the lifting device 214 is positioned on an outside of such annular rail, contrary to the rail and lifting device of FIG. 8.

Figure 12:
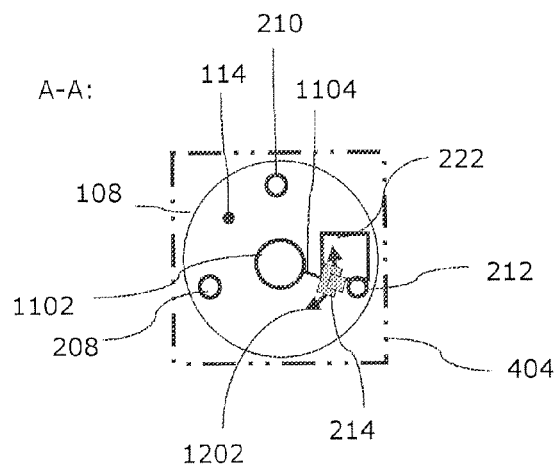
FIG. 12 is a cross sectional view A-A of the further embodiment of the support, lifting device, etc. shown in FIG. 11.

FIG. 12 is a cross-sectional view A-A of the further embodiment of the support, lifting device, etc. shown in FIG. 11. The circular section double arrow 1202 illustrates the moveability of the lifting device 214.

Figure 13:
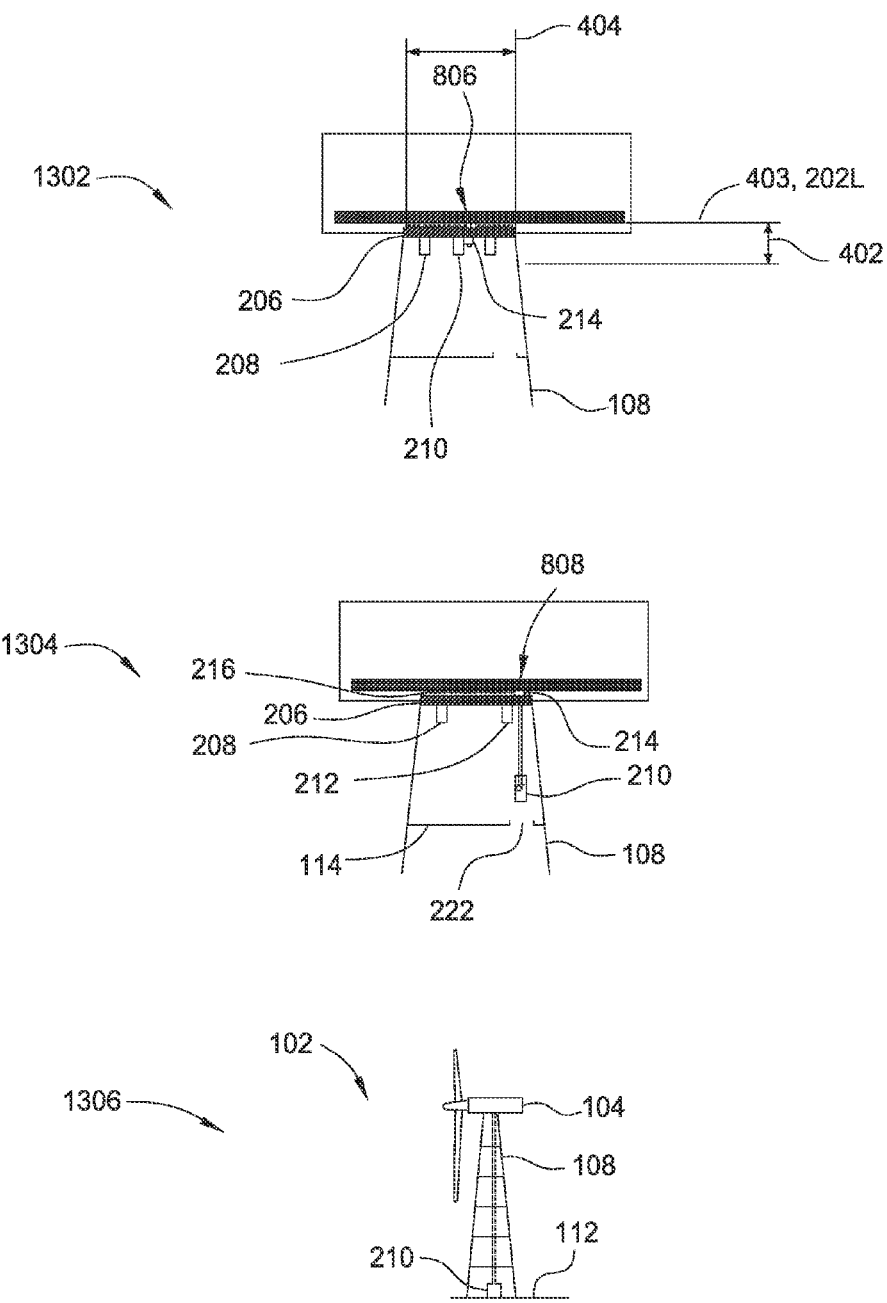
FIG. 13 illustrates a method of moving, such as lowering an item internally in a wind turbine generator.

FIG. 13 illustrates a method of lowering an item internally in a wind turbine generator. In particular, there is illustrated a method of lowering an item, such as 208, 210 or 212, internally in a wind turbine generator 102 which method includes, with the lifting device 214 in the first position 806, connecting, as illustrated at reference number 1302, a lifting medium, such as a wire or chain, of the lifting device 214 to the item, moving, as illustrated at reference number 1304, the lifting device 214 from the first position 806 to a second position 808, where the positions are different in a horizontal direction 118,120, and at least one of the positions is at a vertical position between a lowermost level 202L of the foundation 202, such as just above the yaw bearing 204, and an uppermost level 405 of the tower 104, such as just below the yaw bearing.

Possibly the second position 808 allows lowering the item through a hatch hole 222 comprised in a landing 114 of the tower 108 and further on towards the base 112 of the tower 108 as illustrated at 1304 and 1306.

When the item is not a tool box or similar which is, for example, positioned loosely on the landing 114, but a yaw drive such as 210, the item 210 is disassembled from a structure, such as is fixture, after connecting the lifting medium to the item 210 and prior to moving the lifting device 214 and/or prior to moving and/or lowering the item. Possibly, the item and/or the lifting device is lowered a minor distance before moving the lifting device to a second position in order to increase the movability of the item and/or the moveability of the lifting device 214.

The method and the lifting device described herein are also suited for lifting an item from the base 112 to a given position at the level of the landing 114 or directly to a level within range 402. Thus, a lifting device which can be used for lifting assistance when servicing, such as replacing, various items of, for example, the yawing system by transferring the lifting device 214 as described herein, is disclosed.

Although the present invention has been described in connection with various exemplary embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality.

The invention claimed is:

1. A wind turbine, comprising:
   a rotor configured to generate bending moments;
   a tower;
   a nacelle supported by the tower, wherein the nacelle comprises a foundation that supports components of the nacelle and receives the bending moments;
   a yawing system disposed beneath the foundation and comprising a yaw bearing enabling rotation of the nacelle relative to the tower, wherein the yaw bearing is configured to transfer the bending moments from the foundation to the tower;
   a lifting medium connected to a lifting device at a first end of the lifting medium and connectable to an item at a second end of the lifting medium;
   the lifting device located internally in a portion of the wind turbine and capable of moving the second end of the lifting medium and the item connected to the second end of the lifting medium, wherein the portion of the wind turbine comprises at least one of: the tower, the nacelle, and the yawing system; and
   a support supporting the lifting device and attached to at least one of the yawing system, the nacelle, and the tower,
   wherein the lifting device is moveable from a first position to a second position, and at least one of the first position and the second position is disposed between a lowermost elevation of the foundation and an uppermost elevation of the tower.

2. The wind turbine of claim 1, wherein the lowermost elevation of the foundation is disposed just above the yaw bearing and the uppermost elevation of the tower is disposed just below the yaw bearing.

3. The wind turbine of claim 1, where said lifting device is furthermore capable of lowering and raising the item from one of the first position and the second position and to a third position adjacent to a base of the tower.

4. The wind turbine of claim 1, where at least one of the first position and the second position is disposed in a limited space formed by a boundary of a perimeter in a horizontal direction, and said lowermost elevation of the foundation of the nacelle and said uppermost elevation of the tower.

5. The wind turbine of claim 4, wherein the first position is disposed in the limited space and the second position is disposed outside of the limited space.

6. The wind turbine of claim 4, wherein the perimeter surrounds at least part of the yaw bearing.

7. The wind turbine of claim 4, where at least one of the first position and the second position is comprised in an extended space formed by said boundary, said lowermost elevation of the foundation of the nacelle and an elevation of a top landing disposed within the tower.

8. The wind turbine of claim 7, wherein the second position is disposed in the extended space and the first position is disposed outside of the extended space.

9. The wind turbine of claim 4,
   wherein the lifting device is moveable along a path in or on the support,
   wherein the path is between the first position and the second position, and
   wherein the first position, the second position and the path are disposed within the limited space.

10. The wind turbine of claim 1, wherein the support comprises at least one of: an annular rail and a beam.

11. The wind turbine of claim 1, wherein the lifting device is movable relative to the support and includes at least one of: a guide and one or more wheels, wherein the one or more wheels are in moveable engagement with the support.

12. The wind turbine of claim 1, wherein the support is fixed to an uppermost part of the tower.

13. The wind turbine of claim 1, wherein the support is fixed to a lowermost part of said foundation of the nacelle.

14. The wind turbine of claim 1, wherein the support is fixed to the yaw bearing.

15. The wind turbine of claim 14, wherein the support is fixed to a yaw pinion ring of the yawing system.

16. The wind turbine of claim 1, wherein the support is movable relative to at least one of: the tower and the nacelle.

17. The wind turbine of claim 1, where the support comprises a channel formed member with an inner space within the channel formed member, wherein the inner space is configured to provide a passageway for cables from or to the nacelle.

18. The wind turbine of claim 1, wherein the yawing system further comprises at least one yaw drive for rotating the nacelle relative to the tower by exerting a driving force to a part of the yawing system, wherein at least a centre of mass of the at least one yaw drive is located within the tower.

19. The wind turbine of claim 1, wherein the lifting device comprises a winch or a hoist.

20. A method for moving an item internally in a wind turbine, the method comprising:
    connecting, while a lifting device of the wind turbine is disposed in a first position, a second end of a lifting medium to the item, wherein the lifting device is connected to a first end of the lifting medium and the lifting device is configured to move the item with the second end of the lifting medium, and
    moving the lifting device from the first position to a second position, wherein the first position and the second position are horizontally separated, and at least one of the first position and the second position is disposed between a lowermost elevation of a foundation of a nacelle of the wind turbine, and an uppermost elevation of a tower of the wind turbine,
    wherein the nacelle is supported by the tower, and wherein the foundation receives bending moments generated by a rotor of the wind turbine,
    wherein a yawing system of the wind turbine is disposed beneath the foundation and comprises a yaw bearing enabling rotation of the nacelle relative to the tower, the yaw bearing is configured to transfer the bending moments from the foundation to the tower,
    wherein the lifting device is located internally in a portion of the wind turbine, the portion of the wind turbine comprises at least one of: the tower, the nacelle, and the yawing system, and
    wherein a support of the wind turbine supports the lifting device and is attached to one of the yawing system, the nacelle, and the tower.

21. The method of claim 20, further comprising lowering the item with the lifting device to a third position from one of the first position and the second position, wherein the third position is disposed adjacent a base of the tower.

22. The method of claim 20, further comprising lowering the item towards the base of the tower from one of the first position and the second position, wherein the lowering the item includes lowering the item through a hatch hole disposed in a landing of the tower.

23. The method to of claim 20, further comprising disassembling the item from a structure, wherein the dissembling occurs after the connecting the lifting medium to the item and prior to the moving the lifting device.

* * * * *